United States Patent [19]

Boulanger

[11] 4,163,883

[45] Aug. 7, 1979

[54] KEYBOARD WITH ILLUMINATED KEYS

[75] Inventor: Henry J. Boulanger, Cumberland, R.I.

[73] Assignee: Texas Instruments Incorporated, Dallas, Tex.

[21] Appl. No.: 866,105

[22] Filed: Dec. 30, 1977

[51] Int. Cl.² ............................................. H01H 9/18
[52] U.S. Cl. ..................................... 200/314; 40/546; 362/32
[58] Field of Search ............... 200/314, 340, DIG. 47, 200/312, 313; 362/31, 32; 40/546; 350/96.11, 96.23, 96.24

[56] References Cited

U.S. PATENT DOCUMENTS

| | | | |
|---|---|---|---|
| 2,737,744 | 3/1956 | Sturges | 40/546 |
| 3,043,038 | 7/1962 | Marble | 40/546 |
| 3,205,754 | 9/1965 | Becwar | 200/314 |
| 3,584,174 | 6/1971 | Speands | 200/314 |
| 4,017,700 | 4/1977 | West | 200/314 |
| 4,056,701 | 11/1977 | Weber | 200/314 |
| 4,124,879 | 11/1978 | Schaermer | 362/32 |
| 4,128,298 | 12/1978 | McMillan | 362/32 |

FOREIGN PATENT DOCUMENTS 2142884  3/1973  Fed. Rep. of Germany ............. 362/32
1427320  3/1976  United Kingdom ..................... 200/314

Primary Examiner—Herbert F. Ross
Attorney, Agent, or Firm—John A. Haug; James P. McAndrews

[57] ABSTRACT

A keyboard for use in an automotive control panel or the like has a pattern of switches on a base and has a key member overlying the switches, the key member having a frame mounting the member relative to the base and having a plurality of keys each comprising a button integrally joined to the frame by a self-hinge portion of the key so that the keys overly the respective switches and are individually movable for selectively actuating the switches. The key member is molded of a light transmitting material and an opaque escutcheon is fitted over the key member to permit the key buttons to extend through openings in the escutcheon. Light source means are arranged to direct light into the frame part of the key member so that the light is directed through the frame and along the lengths of the self-hinge portions of the keys into the button portions of the keys at least partly by internal reflection of light within the light-transmitting material of the key member, thereby to illuminate the buttons of the keys in a compact, economical keyboard structure.

7 Claims, 7 Drawing Figures

KEYBOARD WITH ILLUMINATED KEYS

In many cases where a pushbutton switch might be used on an automotive or appliance control panel or the like, it would be desirable to illuminate the pushbutton of the switch so that it is easily located in darkness or in poor ambient lighting conditions. For this reason, pushbuttons are sometimes formed of light-transmitting materials and are backlighted so that light passing through the pushbuttons illuminates the buttons on a control panel. Frequently, however, such backlighted pushbutton switches are bulky and expensive and are difficult to accommodate in the space available on a control panel. In this regard certain keyboards are available which permit a large number of pushbutton switches to be located in closely spaced relation to each other on a control panel in a compact and inexpensive structure but no means have been available for satisfactorily illuminating the pushbuttons of of such keyboards without interfering with the compact, inexpensive nature of the keyboard systems.

It is an object of this invention to provide a novel and improved keyboard switch system; to provide such a system having illuminated keys; to provide such a system having a plurality of keys illuminated from a single light source; to provide such a system in a compact, rugged and inexpensive structure; and to provide such a system which is versatile and which is adapted for wide application or use.

Briefly described, the novel and improved keyboard switch system of this invention includes a plurality of switches or other control means arranged in a pattern on a base. Such switches are of various conventional types and are preferably characterized by a compact and inexpensive structure. Typically, for example, the base comprises a printed circuit card having wire staples secured to the card to form a plurality of contact pairs which are connected to respective conductive paths deposited on the card. A plurality of dish-shaped disc elements are then located over the respective contact pairs to normally engage one contact of the pair and to extend over the other contact of the pair in spaced relation to the other contact, each disc being adapted to be depressed for moving with snap-action toward an inverted dished configuration to additionally engage the other contact to close a circuit between the contacts of the individual pairs.

In accordance with this invention, a key member is molded of a light-transmitting acrylic material or the like and is disposed in overlying relation to the pattern of switches or control means on the base. The key member has an integral frame which mounts the member on the base and has a plurality of integral keys each of which comprises a pushbutton jointed to the frame by an integral self-hinge portion of the key so that the keys are disposed over the respective switches to be individually movable for selectively actuating the switches. Light source means are arranged to direct light into the light-transmitting material of the frame of the key member so that light is conducted through the frame material and is preferably directed along the lengths of the self-hinge portion of each key into the pushbutton portion of each key at least partly by internal reflection of the light within the light-transmitting material of the key member, thereby to illuminate the pushbutton portions of the individual keys. Preferably for example, the frame portion of the key member is secured in fixed position relative to the base and has first surface means thereon. A light source means is also fixed relative to the base to direct light into the frame to be internally reflected from said first surface means to be directed along the lengths of the self-hinge portions of the keys. The distal ends of the self-hinge key portions have second surface means which internally reflect the light into the pushbutton portions of the keys. Preferably opaque escutcheon means enclose the keyboard member and have openings which permit the illuminated pushbutton of the keys to extend through the openings to be manually depressed by a keyboard operator. In this way, satisfactory illumination of the individual keys is achieved in a compact, low cost structure. Good light transfer to the fixed frame of the key member is achieved; the key structure is free of noise under vibration or use; and very close key spacing is easily achieved.

Other objects, advantages and details of the novel and improved keyboard system of this invention appear in the following detailed description of preferred embodiments of the invention, the detailed description referring to the drawings in which.

Figure 1:
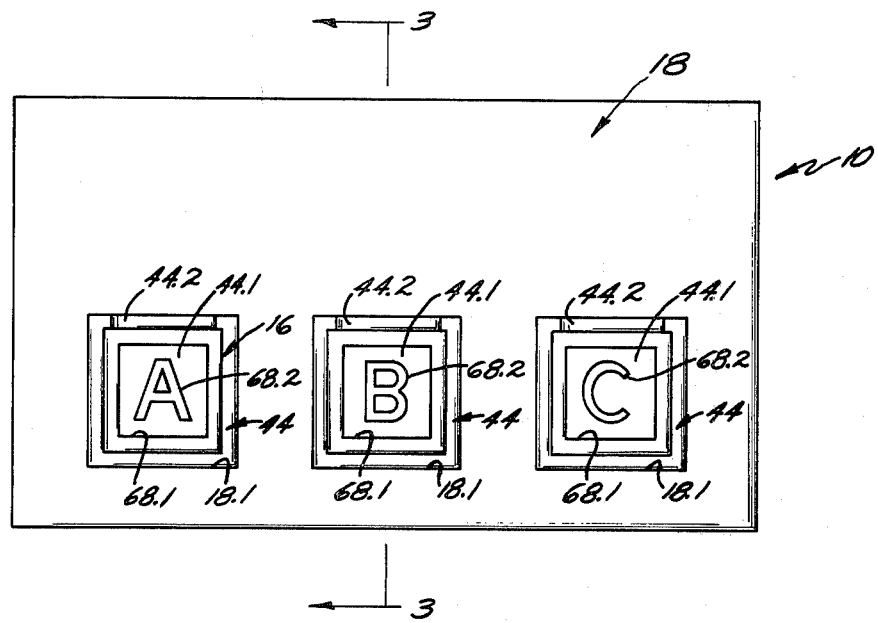
FIG. 1 is a plan view of the improved keyboard switch system of this invention.
Figure 2:
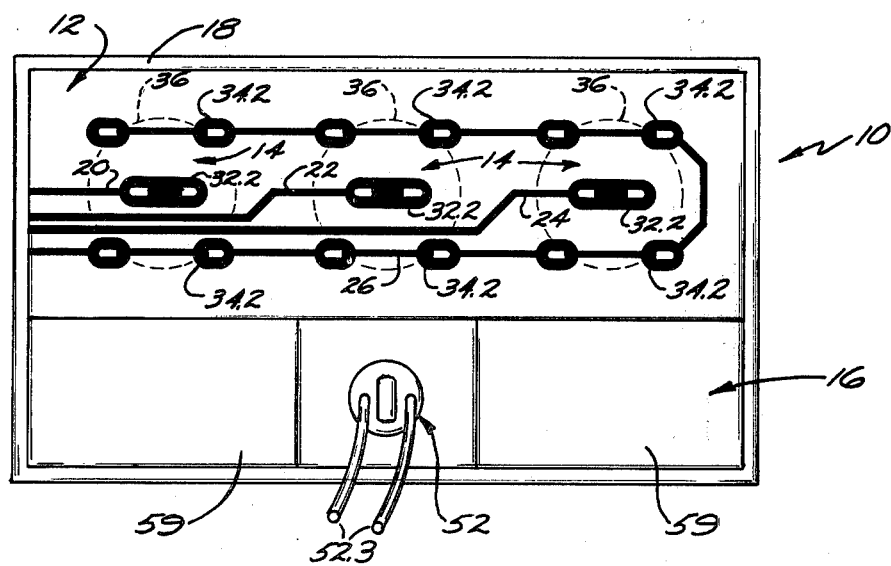
FIG. 2 is a bottom view of the system of FIG. 1.
Figure 3:
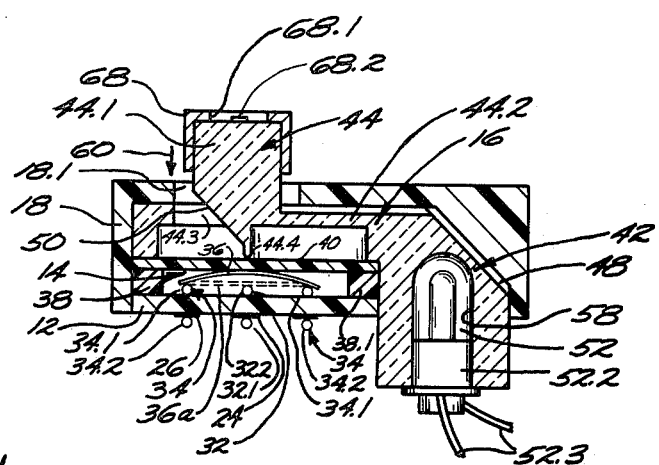
FIG. 3 is a section view along line 3—3 of FIG. 1.

Referring to the drawings, 10 in FIGS. 1-3 indicates the novel and improved keyboard system of this invention which is shown to include a base 12, a plurality of switch or control means 14 arranged in a pattern on the base, a key member 16 overlying the pattern of switches on the base, and preferably a housing or escutcheon 18 which is fitted over the key member.

In the embodiment of the invention which is shown in FIGS. 1-3 for the purpose of illustrating the invention, three of the switches 14 are arranged in a linear pattern or row on the base. The base 12 preferably comprises a conventional printed circuit card of a rigid electrical insulating material having conductive paths 20, 22, 24 and 26 which are formed on the card in any conventional manner and which are preferably arranged to terminate at an edge of the card. Each of the switches 14 preferably includes an inner contact 32 formed of a wire staple and outer contact means formed of a pair of wire staples 34. The inner contact staple has a portion 32.1 disposed at one side of the printed circuit card to form a contact surface and has its ends 32.2 extending through apertures (not shown) in the card to electrically engage respective conductive paths 20, 22, or 24 on the opposite side of the card. The outer contact staples which are preferably of larger wire diameter than the the staple of contact 32, have corresponding portions 34.1 forming contact surfaces at said one side of the card and have ends 34.2 electrically engaged with the common conductive path 26 on the opposite side of the card. A dish-shaped electrically conductive metal disk 36 is disposed over the contact pair 32-34 in each of the switches 14 so that the perimeter of the disk engages the outer contact means 34 and so that the central part of the disk normally extends over the inner contact 32 in spaced relation to the inner contact, whereby the contacts 32 and 34 are normally in an open circuit position. However, the disk 36 is adapted to be depressed or deflected to move with snap-action toward an inverted dished configuration indicated by the broken line 36a in FIG. 2 to additionally engage the contact 32, thereby to close the circuit between the contacts 32 and 34 and between the conductive paths which are connected to those contacts. Preferably a retainer 38 of an electrical insulating material is secured to the base 12 by cementing or in other conventional manner and has openings 38.1 fitted around the respective disks 36 for locating the disks relative to respective contact pairs 32-34 in the switches 14. Preferably also, a pliable film 40 of an electrical insulating material is cemented or otherwise secured over retainer openings 38.1 in conventional manner. As switch means such as those illustrated at 14 in FIGS. 1-3 are conventional and are shown in detail in U.S. Pat. No. 3,725,907, for example, the switches 14 are not further described herein and it will be understood that although three of the switches 14 are arranged in a linear pattern in the system 10, the system includes any desired number of switches 14 arranged in any desired pattern on the base 12 within the scope of this invention. It will also be understood that various types of switches or control means other than those illustrated may also be located on the base 12 within the scope of this invention.

Figure 4:
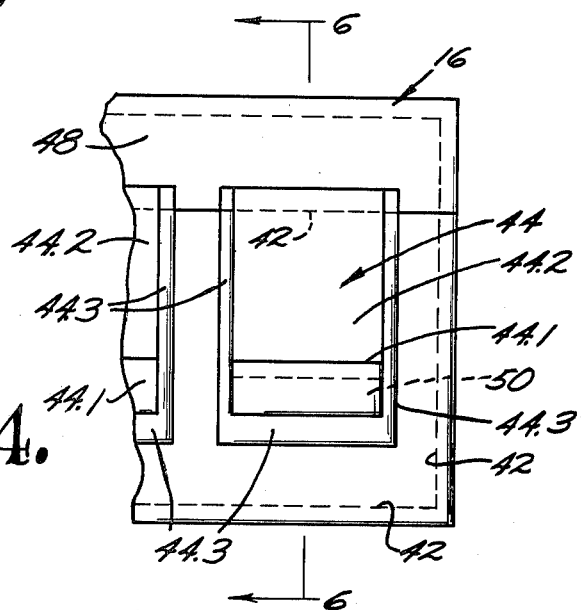
FIG. 4 is a partial plan view of a component of the system of FIG. 1.
Figure 5:
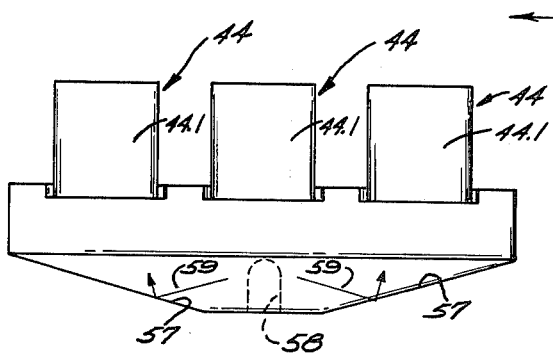
FIG. 5 is a rear view of the component shown in FIG. 4.

In accordance with this invention, the key member 16 is formed of a light-transmitting material and is provided with an integral frame 42 and with a plurality of keys 44. The frame 42 is secured relative to the base 12 by cementing or in other conventional manner so that the keys 44 are located over the respective switches 14 on the base. Each key 44 includes a pushbutton portion 44.1 which is jointed to the frame by an integral self-hinge portion 44.2 of the key. Each key is otherwise defined and separated from the remainder of the key member 16 by a slot 44.3 extending around three sides of the key as is best seen in FIG. 4. Preferably for example the key member 16 is molded of an acrylic material of the like having a suitable refractive index, the material of the member preferably being clear to provide high light transmission and being adapted to be molded with very smooth surfaces thereon. Preferably the member is molded to provide first surface means 48 extending along the frame part 42 of the member and to provide second surface means 50 at the distal ends of each of the self-hinge portions 44.2 of the keys as shown in FIGS. 3-6. That is, the first surface means 48 extend along the frame part 42 adjacent to where self-hinge portions of the keys are joined to the frame. The surface means 48 and 50 are also inclined so that the inner side of the surface 48 is inclined both toward the base 12 and toward the self-hinge portions 44.2 of the keys while each of the surfaces 50 is inclined both toward the self-hinge portions of its key and toward the pushbutton portion of its key. In this arrangement, the inner sides of the surfaces 48 and 50 are generally juxtaposed relative to each other.

Figure 6:
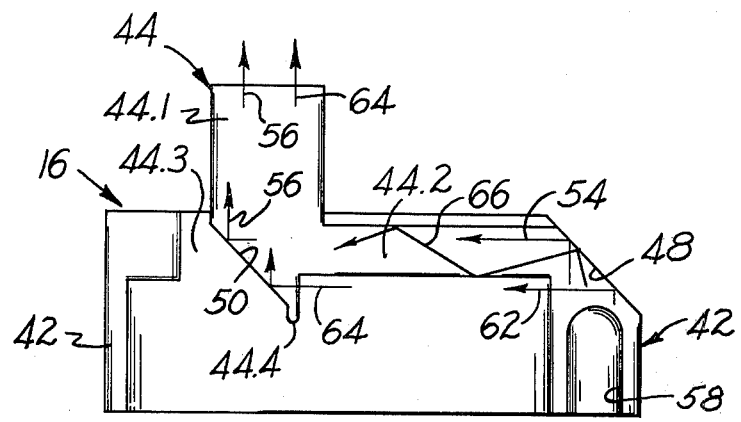
FIG. 6 is a section view along line 6—6 of FIG. 4.

In accordance with this invention, light source means 52 are arranged to direct light into the material of the frame of the key member so that light from the source is conducted through the material of the frame to be internally reflected from the first surface means 48 on the frame as indicated by the arrow 54 in FIG. 6 to be directed along the length of the self-hinge portion 44.2 of an adjacent key and to be internally reflected again from the second surface means 50 at the distal end of the key into the pushbutton portion of the key for illuminating the pushbutton as indicated by arrows 56 in FIG. 6. That is, the exterior surfaces 48 and 50 on the key member are molded smooth, and are polished if necessary, so that, as a result of the difference between the refractive index of the member material and the relatively lower refractive index of the air surrounding the member 16, light which impinges on the member surfaces 48 and 50 at an angle equal to or greater than the critical angle of total internal reflection for the light-transmitting material is conducted at least partly through the material of the member 16 from the fixed frame of the member into and through the movable pushbutton portions of each key. Preferably, the light source means comprises a conventional lamp having a bulb portion 52.1 fitted into a well 58 in the frame part of the key member and having a lamp base 52.2 secured to the frame 42, the lamp having leads 52.3 electrically connected to a power source as indicated in FIGS. 2 and 4 for energizing the lamp. If desired, the frame 42 of the key member is provided with a plurality of conventional funnel surfaces 57 for receiving light from a single lamp 52 and for directing that light toward the self-hinge portions of keys as indicated by the arrow 59 in FIG. 5 while retaining the compact nature of the system 10. Alternately, of course, a greater number of lamps may be used and, where required, other surfaces are provided on the frame 42 for directing light from each lamp along the length of one or more self-hinge portions of the member as desired for illuminating one or more pushbutton portions of the member keys with each lamp.

In a preferred embodiment of the system 10 as shown in FIGS. 1-6, each of the keys 44 is provided with a depending portion 44.4 at the distal end of the key so that, when the key is depressed by a keyboard operating for flexing the self-hinge portion 44.2 of the key to move the key in the direction indicated by the arrow 60 in FIG. 3, the depending part of the key facilitates deflection of a snap-disk 36 to move the disk to the closed circuit position indicated by lines 36a in FIG. 3. Preferably, the self-hinge portion 44.2 of each key has a selected limited thickness to facilitate flexing of the self-hinge when the key is depressed as indicated by the arrow 60. In addition, the pusbutton portion 44.1 of each key is molded in upstanding relation to the self-hinge portion of the key to extend above the plane of the self-hinge key portions. Preferably also the principal internally relective surfaces 48 and 50 provided on the frame and on each key are large relative to the thickness of the self-hinge portion of the keys to increase the amount of light which is directed from the frame 42 into each key pushbutton. For example, as illustrated in FIG. 3, the surface 50 preferably extends into the depending part 44.4 of the key whereby light reflection from the similarly proportioned frame surface 48 to be directed along the length of the self-hinge outside the material of the self-hinge as indicated by the arrow 62 in FIG. 6 is also adapted to be reflected from the surface 50 into the key pushbutton as indicated by arrows 64 in FIG. 6. Of course, in the structure described, the key member material is also adapted to conduct other light from the source 52 along random paths to the key pushbutton as indicated by the arrow 66 in FIG. 6.

In the preferred embodiment of this illustrated in FIGS. 1-6, an escutcheon or housing 18 is preferably fitted over the key member 16 and is secured relative to the base 12 by cementing or in other conventional manner, the escutcheon having openings 18.1 fitted over the respective push-button portions of the keys 44. The escutcheon is preferably formed of a conventional opaque molded organic material such as ABS or the like so that only light directed through the push-button key portions and through the openings 18.1 in the escutcheon is visible to a key board operator. Preferably also a covering of any desired type is placed on each of the key pushbuttons to serve as indicia for marking the individual keys. For example, if desired, a cap 68 is fitted over each key push-button, the cap having an opening 68.1 therein. Opaque indicia in the form of a coating 68.2 is then provided on the top of the pushbutton.

Figure 7:
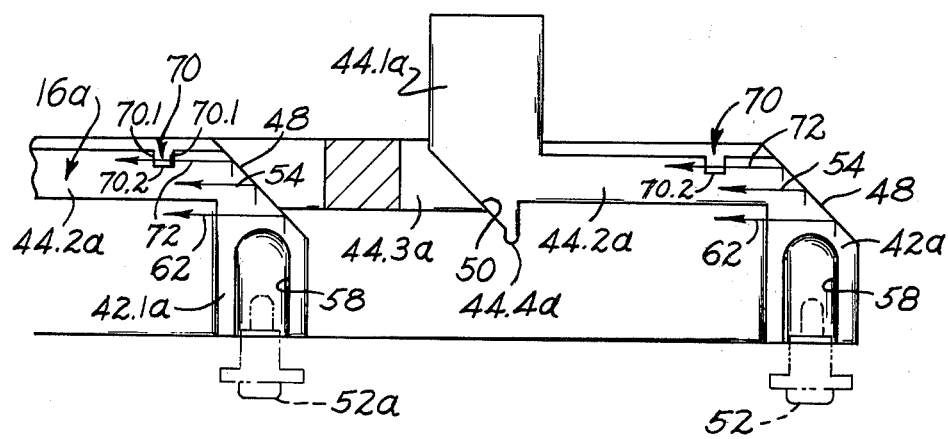
FIG. 7 is a section view similar to FIG. 6 illustrating an alternate preferred embodiment of the invention.

In alternate embodiments of the keyboard system of this invention, the key member 16 is modified in various ways as indicated in the key member 16a shown in FIG. 7. That is, if desired, each self-hinge portion 44.2a of the key member is provided with a groove 70 extending transversely across the self-hinge portion, thereby to provide a reduced thickness portion in the self-hinge to provide a preferred bending location for the hinge. In this arrangement, the self-hinges in the system are adapted to dislay greater uniformity of flexing so that the keys are adapted to be depressed more uniformily. Where the grooves 70 are provided, the opposite lateral surfaces 70.1 of the groove are preferably disposed in parallel facing relation and are preferably polished to permit high transmission of light through those groove surfaces as indicated by the arrow 72 in FIG. 7. In this construction, a substantial amount of light is adapted to be directed along the length of the self-hinge 44.2a even if the reduced thickness portion 70.2 of the molded, organic self-hinge material should become crazed and lose some of its original light transmission properties after repeated flexing of the hinge. In other alternate embodiments of this invention, where several rows of switches 14 are arranged in a pattern on the base 12, the key member 16a is provided with supplementary fixed frame portions 42.1a as is also indicated in FIG. 7 and, if desired, supplementary light source means 52a are arranged to direct light into the supplementary frame portions as will be understood.

In these arrangements, the keyboard systems of this invention are provided with a compact, low cost, and reliable structure yet each of the keys of the system are provided with good illumination to provide sharp contrast relative to the opaque escutcheon plate of the system. Each of the keys of the system is adapted to be moved individually for actuating a respective switch 14 on the base to close a circuit between a pair of switch contacts or to actuate other control means. The light source means are accommodated where they do not interfere with switch operation in an arrangement where the light source means is still adapted to provide good illumination for one key or for a plurality of the keys as desired. The frame of the key member which receives light from the light source is fixed relative to the light source to assure proper reception of the light into the frame material. Further, the hinging of the keys does not require support which could be noisy during vibration or use of the keyboard system and the key member structure will direct a substantial amount of light along the hinges into the pushbutton of the system keys.

It should be understood that although preferred embodiments of the invention have been described by way of illustrating the invention, this invention includes all modifications and equivalents of the disclosed embodiments falling within the scope of the appended claims.

I claim:

1. In a keyboard system having control means mounted on a base and a member overlying the control means, said member having a frame mounted the member relative to the base and having a key with a button portion integrally joined to the frame by a self-hinge portion of the key movable for selectively actuating the control means, the improvement in which the key member is formed of a light-transmitting material, and light source means direct light into the material of the frame to be conducted at least partly by internal reflection within the member material into the button portion of the key for illuminating the button portion of the key.

2. In a keyboard system having a plurality of control means mounted in a pattern on a base and a molded key member overlying the pattern of control means, said member having a frame mounted the member relative to the base and having a plurality of keys each with a button portion integrally joined to the frame by a self-hinge portion of the key so that the keys are disposed over the respective control means for movement to selectively actuate the respective control means, the improvement in which the key member is molded of a light-transmitting material and light source means direct light into the material of the frame to be conducted along the self-hinge portions of the member into the button portions of the keys at least partly by internal reflection of the light within the member material for illuminating the button portions of the keys.

3. A keyboard system as set forth in claim 2 wherein said member frame has first surface means reflecting said light along the self-hinge portions of the keys, said button portions of the keys extend upwardly from distal ends of said self-hinge portions to dispose tops of the button portions in a plane above said self-hinge portions of the member, and said self-hinge portions of the member have respective second surface means at the distal ends thereof reflecting said light through the tops of the button portions of the keys.

4. A keyboard system as set forth in claim 3 wherein the self-hinge portion of the member joined to each key has a groove extending transversely across the self-hinge portion defining a preferred bending location in the self-hinge portion, said groove having juxtaposed opposite lateral side surfaces for permitting light directed along the self-hinge portions to pass through said side surfaces of the grooves to be conducted through the material of the self-hinge portion by internal reflection of the light within said material.

5. A keyboard system as set forth in claim 4 wherein the distal end of the self-hinge portion of the member has a depending portion accommodating part of said second surface means and disposed so that light directed along the length of the self-hinge portion adjacent to the self-hinge portion is received within said depending portion to be internally reflected from said second surface means into the button portion of the key.

6. A keyboard system as set forth in claim 3 having opaque escutcheon means fitted over said keyboard member, said escutcheon means having openings therein and having said tops of the keybutton portions extending through said openings to be illuminated in said openings.

7. A keyboard system as set forth in claim 6 having opaque cover means on said button portions of the keys, said cover means having openings therein at said illuminated tops of the key button portions to permit the illuminated tops of the button portions to be visible through the cover openings.

* * * * *